United States Patent [19]

Gross

[11] 4,421,020

[45] Dec. 20, 1983

[54] APPARATUS FOR THE CONCENTRATION OF FRUITS

[75] Inventor: David R. Gross, Orrville, Ohio

[73] Assignee: The J. M. Smucker Company, Orrville, Ohio

[21] Appl. No.: 460,462

[22] Filed: Jan. 24, 1983

Related U.S. Application Data

[62] Division of Ser. No. 266,203, May 22, 1981, Pat. No. 4,379,796.

[51] Int. Cl.³ .................... A23L 1/212; A23L 2/08; A23N 1/00
[52] U.S. Cl. ........................................ 99/472; 34/92; 99/477; 99/483; 99/495; 366/139
[58] Field of Search ............... 99/467, 468, 472, 495, 99/473, 474, 516, 536, 483, 477, 484, 478, 348; 366/139; 34/15, 92; 426/486, 489, 615; 159/4 VM

[56] References Cited

U.S. PATENT DOCUMENTS

| 230,525 | 7/1880 | Brinton . |
| 685,243 | 10/1901 | Atwood . |
| 1,773,425 | 8/1930 | Forrest . |
| 1,871,507 | 8/1932 | Gardner . |
| 2,386,052 | 10/1945 | Lundy . |
| 2,593,983 | 4/1952 | Chalupa . |
| 2,977,629 | 4/1961 | Grebe .............................. 99/472 X |
| 3,008,838 | 11/1961 | Brunsing et al. ................... 426/302 |
| 3,310,881 | 3/1967 | Fritzberg . |
| 3,615,599 | 10/1971 | Sakamoto . |
| 4,058,634 | 11/1977 | Kunz .............................. 426/465 X |
| 4,313,372 | 2/1982 | Gerow et al. ........................ 99/483 |

FOREIGN PATENT DOCUMENTS

| 529227 | 8/1956 | Canada . |
| 385379 | 3/1907 | France . |
| 653038 | 9/1927 | France . |
| 601162 | 5/1948 | United Kingdom . |

Primary Examiner—Timothy F. Simone
Attorney, Agent, or Firm—Body, Vickers & Daniels

[57] ABSTRACT

Apparatus for concentrating fruits which preserves the original coloration and freshness of flavor and retains the structural integrity of the fruit for subsequent preserving or canning operations. The apparatus consists of a first high vacuum chamber means heating the chamber to a temperature to maintain the fruit at a temperature below the boiling temperature of water at a maintained vacuum and a second vacuum chamber in the form of a rotating cylinder such that the juices in the fruit cells migrate to the surface of the fruit and coat the walls of the cylinder, and means heating the second chamber to a temperature above the boiling point of water at the maintained vacuum to boil off this coating.

2 Claims, 3 Drawing Figures

APPARATUS FOR THE CONCENTRATION OF FRUITS

This is a division of application Ser. No. 226,203 filed May 22, 1981, U.S. Pat. No. 4,379,796.

This invention pertains to the art of dehydration and, more particularly, to a new and improved dehydration apparatus for the concentration of fruits prior to shipping and/or canning thereof.

The invention is particularly applicable to the concentration of fruits which contain large amounts of water which must be removed in the ultimate manufacturing process, such as strawberries, peaches, pears and the like, and will be described with particular reference thereto although it will be appreciated that the invention has other and broader applications and may be used for the concentration of vegetables which in the process of being canned or preserved must have substantial amounts of water removed in the cooking or canning process or which must be shipped long distances prior to cooking or canning.

BACKGROUND

In the preservation of fruits by a canning or preserving process, the fruits must be first transported to a suitable processing plant where they are subjected to large amounts of heat to reduce the water content and increase the solids content and/or to have additional ingredients such as sugar and/or citric acid added thereto for the purpose of causing the pectin in the fruit to set up. Oftentimes in the cooking process, the batch of fruit is subjected to a partial vacuum so that the cooking temperature may be lowered and the evaporation of the water contained in the fruits accelerated. Such processes heretofore have resulted in the gases and liquids in the cells of the fruit being evolved so rapidly as to burst or explode the cell walls and thus to destroy the structural integrity of the fruit and with the individual pieces, if any, of the fruit in the ultimate product being indistinguishable one from the other.

In general, it has long been desired to maintain the structural integrity of at least a substantial portion of the fruit and also to maintain the original coloration of the fruit which is frequently destroyed during the above-referred-to cooking process.

Additionally, it is necessary to transport the fruit from the area where it is grown to the ultimate processing plant which in some instances can be many thousands of miles away from the area where the fruit is grown. Transporting the fruit over such distances presents extreme problems because in the time required to ship the fruit over such distances and at the temperatures which may be encountered during the shipment, the fruit tends to spoil, e.g. by rotting, by the commencement of fermentation, by compression, or by a combination of all three. Accordingly, it has been customary to ship the fruit from the point of growth to a local processing plant where the fruit is immediately frozen and packed into large drums preparatory to shipping it to the remote canning or preserving plant where as above pointed out the fruit is processed to reduce the water content to a required amount prior to the ultimate canning or bottling step.

The shipment of this water (which must ultimately be removed) over long distances is very expensive, not only due to its weight but due to the cost of the drums as well as the cost of the energy required to freeze the water prior to shipment, which energy is lost when the fruit is allowed to thaw at is ultimate destination at the canning or bottling plant.

Heretofore, any efforts to remove this water prior to shipment have resulted in destruction of the structural integrity of the fruit such that the resultant canned product was a mass of indistinguishable fruit pieces.

Research leading to the present invention indicated that this water, having sugar and the fruit flavor dissolved therein, is contained in closed cells having semi-permeable cell walls and/or between the cells and that the rate of diffusion of the water from the cells and/or from between the cells must be carefully controlled to prevent structural damage to the cell walls and/or the fruit itself.

THE INVENTION

The present invention contemplates a new and improved apparatus for carrying out a method for the concentration of fruits which overcomes all of the above-referred-to difficulties and others and results in a concentrated fruit wherein each piece of fruit substantially retains its structural integrity and its original coloration while having had its overall weight reduced by any desired amount such that the cost of shipping over long distances is substantially reduced.

In the method which the present invention carries out selected raw fruits, either whole or in sections and either plain or in a liquid matrix, are placed in a chamber and a vacuum created sufficiently high that air in the cells of the fruit and/or dissolved in the water of the fruit will migrate through the cell walls to the surface of the fruit while holding the temperature of the fruit at a temperature below the boiling point of water at the particular vacuum used and with the rate of change of pressure from atmospheric to the chamber vacuum being insufficient to cause a differential pressure between the inside of the cells and the outside which will create forces sufficient to rupture the cell walls. Such vacuum also causes some of the liquids in the cells to migrate through the cell walls to the surface of the fruit but by holding the temperature down, the liquids do not boil or vaporize to create large increases in volume and large internal cell pressures which can rupture the cell walls.

The evolution of such air is quite apparent due to a substantial foaming action and this degassing or deaeration step is continued long enough for the rate of foaming to at least have substantially decreased or to have ceased altogether.

Migration of the liquids is the result of osmosis and/or diffusion through pores in the semi-permeable cell walls or from between the cell walls.

Thereafter, the fruit is moved in a thin layer through a smooth-surfaced, rotating, gently sloped, generally horizontal cylinder maintained at a vacuum with the same limitations as in the degassing or deaerating step, the cylinder being heated to a temperature in excess of the boiling temperature of water at the vacuum maintained. Such vacuum causes a slow migration of liquid through the cell walls of the fruit which liquid then coats the walls of the rotating cylinder. The rate of rotation of the cylinder is such that at the temperature to which the cylinder is heated, at least a major portion, and preferably substantially all, of the inner walls of the cylinder are continuously wetted by the coating of liquid which migrates from the fruit. The thickness of the layer of the fruit is held sufficiently thin that the fruit in the lower portion of the layer is not subjected to destructive compressive forces by the weight of the fruit in the upper portion of the layer. The walls of the cylinder are smooth so that the surface thereof slides under the fruit and does not cause it to be carried vertically upwardly where it might tumble back resulting in destructive shearing or impact forces on the structural or physical integrity of the fruit. The slope of the axis downwardly from the entrance is enough to cause the fruit to advance through the cylinder under the force of gravity and without the need for mechanical members such as screws or paddles which would physically damage the fruit. The process is a continuous process rather than a batch process.

The primary evaporation occurs from this coating on the cylinder walls. Because substantially all of the wall surface is coated and because the temperature of the juices can never exceed the boiling temperature of the juices at the particular vacuum maintained, the entire interior of the cylinder and importantly the thin layer of fruit in the bottom portions thereof are never heated above this temperature even though the temperature of the metal of the cylinder may be higher than the boiling temperature. At a vacuum of 28.5 inches of mercury (2.6 inches absolute pressure), the boiling temperature of water is 93° F. (34° C.). Thus, the fruit is never heated above 100° F., a temperature sufficiently low that it does not affect the coloration of the fruit or the fruit flavors in the juices. In fact, this is a temperature below the maximum to which the fruit might be heated by ambient air or the sun while growing in the fields.

Such evaporation is maintained until the fruit has reached the desired degree of concentration. Normally and preferably, this will be a total reduction in the weight of the fruit of 40-60%. Thereafter, the concentrated fruit is removed from the cylinder and can be immediately consumed or processed to the final product, e.g. by cooking or freezing, or packed and frozen for shipment to remote processing operations.

Upon removal, each individual piece of fruit is in substantially the same shape, form and color as it was before the deaeration step except for a slight reduction in volume due to the loss of water and for a sticky layer of concentrated juices on the surface. In particular, the fruit does not have wrinkly appearance of a prune or raisin.

It will be appreciated that in some instances, where shipping costs are relatively high, a greater amount of water than that indicated may be removed which water can then be added back after shipping and during the ultimate manufacturing process.

It has, of course, been known to concentrate fruits by subjecting them to elevated temperatures and a vacuum but heretofore, so far as I am aware, the combination of the temperature and the vacuum used resulted in an evolution of air and the evaporation of juices at a rate faster than could pass through the walls of the cells by osmosis or diffusion such that the forces created by the differential pressures ruptured the cell walls resulting in a breakdown in the structural integrity of the fruit. Further, such processes involved mechanical forces on the fruit which damaged the structural integrity of the various pieces.

It has also been known to concentrate fruit by a process known as freeze drying wherein the fruit is dried directly from a frozen state by the use of a high vacuum. Here, ultra-high vacuums are required and the evaporative rates are so low that equipment and operating costs are prohibitive.

By first subjecting the fruit to a controlled vacuum while limiting the temperature of the fruit to below the boiling point of water at that pressure, the air either dissolved in the fruit juices and/or trapped in the cells can migrate through the cell walls at a rate generally equal to the rate of gas release such that the forces generated by the differential pressures are insufficient to destroy or rupture the cell walls.

Also, by degassing prior to the primary evaporative step, air in the form of foam is not present to interfere with the heat exchange coefficients from the cylinder walls to the fruit juices.

Once the rate of evolving of the air has decreased, I have found that it is then possible to attempt to heat the fruit above the boiling temperature of water in the cells without creating differential pressures sufficient to develop forces capable of breaking the cell walls. Further, by moving the fruit in a thin layer in the rotating cylinder, damage to the structural integrity of the fruit due to compression is avoided. By rotating a smooth-surfaced cylinder sufficiently slowly, the fruit does not tumble in the cylinder and damage to the structural integrity of the fruit by shearing forces is avoided. By having the entire inner surface of the cylinder coated with the juices, a large evaporative surface is obtained and thus rapid evaporation rates can be obtained. By sloping the cylinder, the fruit is advanced longitudinally therethrough using the force of gravity and without the need for any mechanical members such as screws or paddles.

In accordance with the invention, a new and improved apparatus for the concentration of fruit is provided comprised of: first and second chambers in communication with each other; means for maintaining said chambers at a vacuum; means for heating the first chamber to a temperature not higher than the boiling temperature of water at the vacuum used; other means for heating the walls of the second chamber to a temperature above the boiling temperature of water at the vacuum used; and, means for advancing the fruit through said first chamber into and through said second chamber. A pair of sequentially actuated double valve arrangements are provided, one at the entrance of the first chamber and the other at the exit of the second chamber, for adding and removing fruit with a minimum admittance of air.

Further in accordance with the invention, at least the second chamber includes means for rotating the chamber at relatively low speeds about a gently downwardly sloping axis toward the exit end whereby fruit positioned therein will be advanced longitudinally and juices migrating from the interior of the fruit will coat the inside walls of the chamber where water in the juices will be boiled off or evaporated.

OBJECTS

The principal object of the invention is the provision of a new and improved apparatus for the concentration of fruits which removes substantial portions of the water in the fruit without destroying the structural or physical integrity of the fruit and retains the original coloration, flavor and external appearance of the fruit.

Another object of the invention is the provision of a new and improved apparatus for concentrating fruits wherein the fruit is first subjected to a vacuum while being maintained at a temperature below the boiling temperature of water at that vacuum pressure such that air will be evolved from the fruit without developing cell wall rupture forces in the fruit and thereafter while maintaining the vacuum, the juices of the fruit are caused to migrate to the surface and totally coat the surfaces of the fruit and a heated cylinder whereby the temperature in the cylinder and thus the fruit can never be above the boiling temperature at the maintained vacuum.

Another object of the invention is the provision of a new and improved apparatus for the concentration of fruits which first deaerates the fruit without boiling the water in the cells and then evaporates the water contained in the cells thereof.

Another object of the invention is the provision of a new and improved apparatus for the concentration of fruits which enables the economical shipping of fruits over long distances between the point of harvest and the ultimate processing operation.

Another object is the provision of a new and improved apparatus which enables the concentration of fruits on a continuous rather than a batch process.

Another object is the provision of a new and improved apparatus for concentrating fruits wherein the individual pieces of the outgoing fruit are almost entirely whole and with a highly increased solid content over the ingoing fruit.

Another object of the invention is the provision of a new and improved apparatus for the concentration of fruit wherein the fruit is subjected to a vacuum to cause its juices to slowly migrate from the cells of the fruit to the surface at a rate sufficiently slowly that the cell walls are not broken and the liquid on the surface is then coated onto a heated surface where it evaporates.

Another object of the invention is the provision of a new and improved apparatus for the concentration of fruit wherein the fruit need not be heated above 100° F. (37.8° C.) but rapid evaporation of the fluids can still be achieved.

Another object is the provision of a new and improved apparatus for concentrating fruit wherein the original fresh coloration, flavor and/or structural integrity are maintained.

Another object of the invention is the provision of a new and improved apparatus comprised of a pair of chambers, each adapted to be maintained at a substantial vacuum, one of the chambers having means for being heated to a temperature below the boiling temperature of water at the particular vacuum employed and the other chamber having means for being heated to temperatures above the boiling temperature of water at the particular vacuum maintained.

Vacuum as used herein means a gas pressure below atmospheric which as is known is approximately 14.7 pounds per square inch or 30.1 inches of mercury. Thus, a vacuum of 28.0 inches of mercury indicates the differential pressure between that in the processing container and external air pressure, it being appreciated that 28.0 inches of mercury is in fact approximately 2.1 inches of pressure above absolute zero. When a vacuum pressure is used hereinafter, it will always indicate the differential pressure between that in a container and atmospheric pressure.

DRAWINGS

The invention may take physical form in certain parts and combinations of parts, a preferred embodiment of which will be described in detail hereinafter and illustrated in the accompanying drawings which form a part hereof and wherein.

PREFERRED EMBODIMENT

Figure 1:
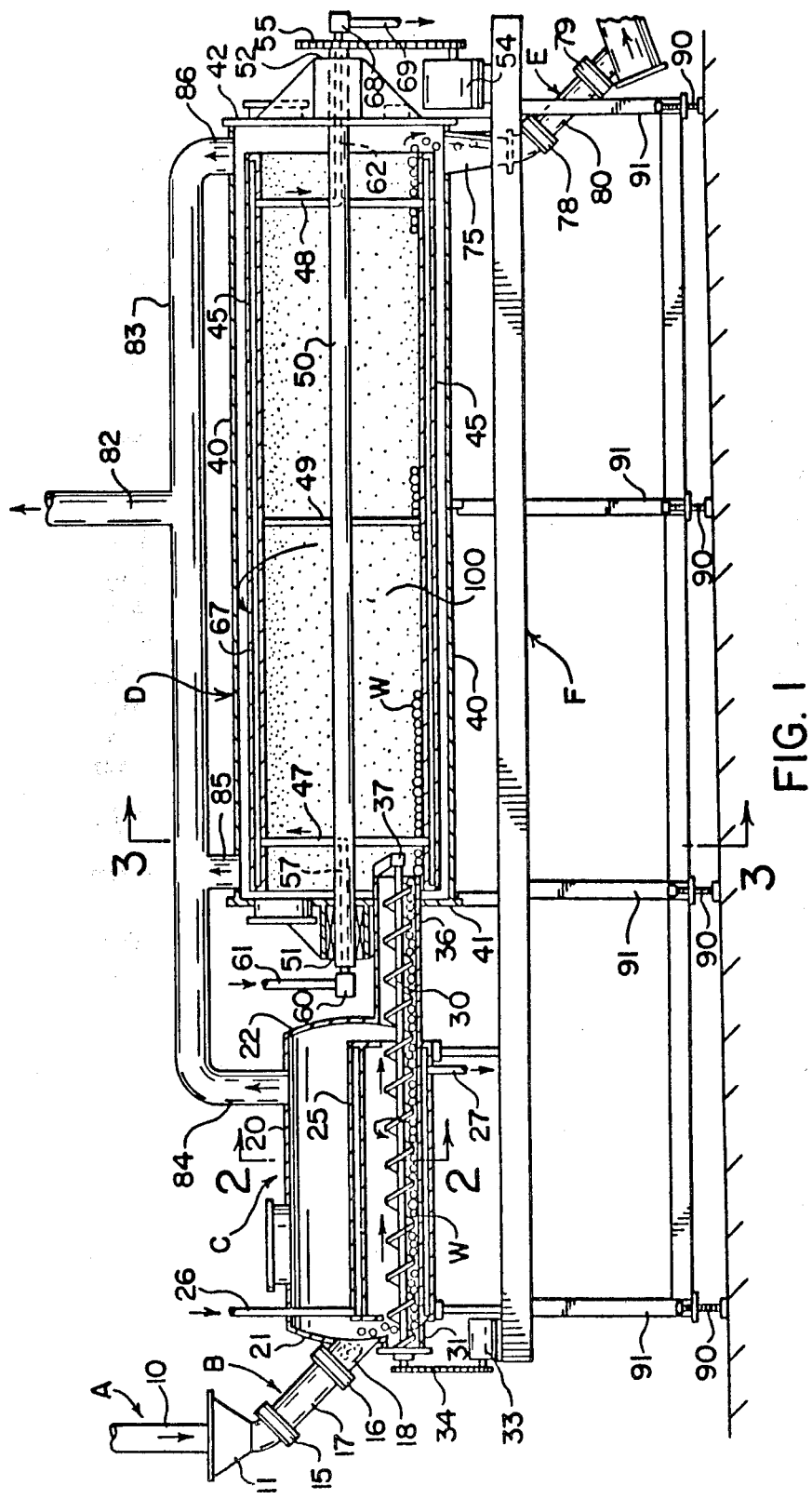
FIG. 1 is a side cross sectional view somewhat schematic of a preferred embodiment of apparatus for the concentration of fruits and for carrying out the method of the invention.
Figure 2:
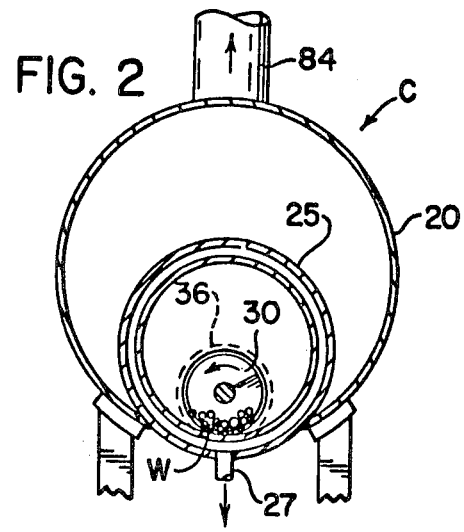
FIG. 2 is a cross sectional view of FIG. 1 taken approximately on the line 2—2 thereof; and, FIG. 3 is a cross sectional view of FIG. 1 taken approximately on the line 3—3 thereof.
Figure 3:
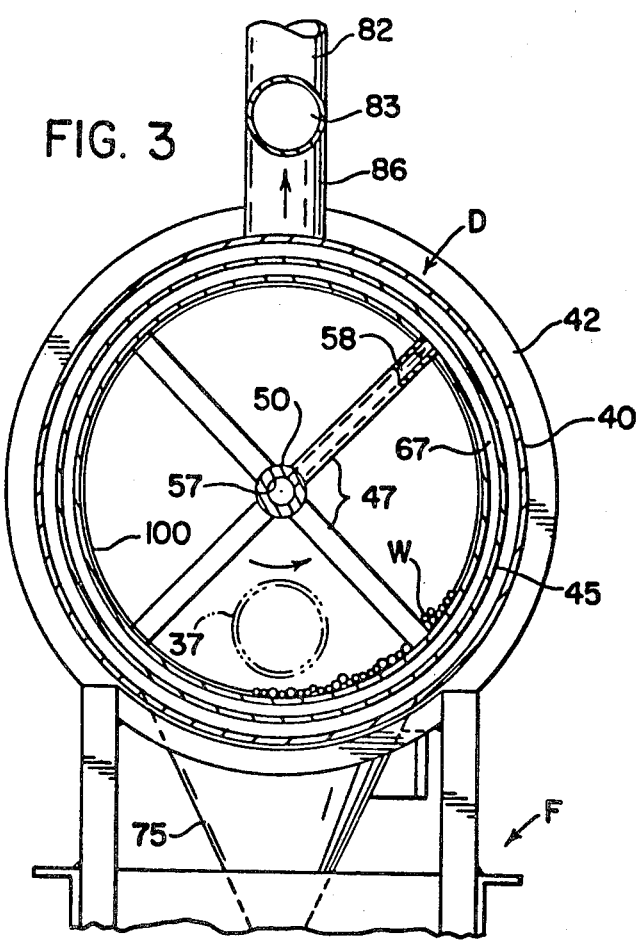

Referring now to the drawings wherein the showings are for the purposes of illustrating a preferred embodiment of the invention only and not for the purposes of limiting same, FIG. 1 in general shows reading from left to right an inlet pipe A for feeding raw fruit W (either in individual pieces or in a liquid matrix) into the apparatus, an airlock B, a first or deaerating chamber C, a second or concentrating chamber D, and an exiting airlock E, the entire apparatus being mounted on a framework F having provision for adjusting the longitudinal axis so that it slopes downwardly toward the airlock E.

The fruit W is any known fresh fruit such as without limitation strawberries, peaches, pears, raspberries, oranges, lemons and cherries, either whole and as harvested or sliced and/or peeled but always in discrete sized pieces as desired to appear in the final product. The fruit is usually washed and graded and may be plain or in a liquid matrix such as a sugar containing syrup.

The inlet pipe A forms no part of the present invention and may take any desired form. In the embodiment shown, it consists of a tube 10 of a diameter large enough to handle the largest pieces of fruit to be concentrated feeding into a conical hopper 11 which in turn communicates at the lower end with the airlock B.

The airlock B is relatively conventional and is comprised of a pair of spaced gate valves 15, 16 and an intermediate chamber 17. The valves 15, 16 are each conventional in construction and of a type capable of providing, when closed, an airtight seal and having a passage when open sufficient to pass the largest pieces of fruit to be concentrated. The valves 15, 16 are operated sequentially, the valve 15 being first opened to allow the chamber 17 to be filled with valve 16 closed. The valve 15 is then closed and the valve 16 is opened to allow fruit to pass on into the deaerating chamber C through a short tubular member 18. If the chamber is filled each time the valves are operated, a minimum amount of air is present to pass into chamber C.

The deaerating chamber C is comprised in general of a large diameter cylinder 20 having left and right dished end bells 21, 22 welded thereto, the end bell 21 having an opening for the tubular member 18 whereby fruit can pass into the deaerating chamber C.

Inside of the cylinder 20 is a double walled cylindrical tube 25 open at both ends and having an inlet conduit 26 at its left end and an outlet conduit 27 at its right end whereby hot water or steam of a controlled temperature can be circulated between the double walls of the cylinder 25 to heat the cylinder to any desired temperature above ambient. The left end of tube 25 extends to the left of the discharge end of member 18 and is open to receive fruit W therefrom.

A worm screw 30 extends through the tube 25 and is journaled at the left end in a boss 31 in the end bell 21 and driven by a variable speed electric motor 33 through a suitable mechanical linkage such as the chain drive 34. A tubular member 36 extends to the right from the end bell 22 into the concentrating chamber D. The worm screw 30 extends from a point to the left of the end bell 21 through the end bell 22 and this tubular member and is journaled in a bearing member 37 at the right-hand end of the tubular member 36. The worm screw 30 is rotated in a direction and at a speed so as to advance pieces of fruit W from left to right through the deaerating chamber C and into the concentrating chamber D.

The concentrating chamber D is comprised in general of a cylindrical drum 40 having left and right end plates 41, 42 in sealed relationship with the ends of the cylinder 40 to provide an airtight chamber.

Inside of the cylinder 40 is an elongated double walled cylinder 45 supported for rotation in the cylinder 40 by internal stokes 47, 48 and 49 extending inwardly to a shaft 50, the left-hand end of which is journaled in a gas sealing type bearing 51 mounted on end bell 41 and the right-hand end of which is journaled in a gas sealing type bearing 52 mounted on end bell 42. The right-hand end of shaft 50 extends beyond the bearing 52 and is rotatably driven by a variable speed electric motor 54 through a conventional chain drive 55.

The left end of shaft 50 has a passage 57 therein communicating a passage 58 in one of the spokes 47 with a suitable swivel joint 60 in turn connected to an inlet steam pipe 61. In a like manner, the right-hand end of the shaft 50 has an internal passage 62 communicating with a passage similar to passage 58 in one of the spokes 48 and at the right-hand end through a swivel connection 68 to a condensate return line 69. The passages in the spokes communicate with the space 67 formed by the double walled cylinder 45. Space 65 may be suitably baffled.

The left-hand end of cylinder 45 is located to the left of the right end of the tube 25 so that any fruit moving from the tube 25 into the cylinder 45 will rest on the inner surface of the cylinder 45.

The right-hand end of the cylinder 45 is such that fruit advancing through the cylinder 45 can fall off the end into a tube or hopper 75 where it collects until the airlock E is actuated.

The airlock E is identical in construction to the airlock B and will not be detailed further herein except to say that it has an inlet valve 78 and an outlet valve 79 separated by a tubular chamber 80.

The deaerating chamber C and the concentration chamber D and the interconnections therebetween and thereto as well as all of the bearings are airtight and means are provided for evacuating same. Such means in the embodiment shown consists of a pipe or tube 82 communicating through a header 83 and risers 84, 85 and 86 with the cylinder 20 and the cylinder 40 all generally as shown.

The tube 82 communicates to a vacuum pump (not shown) having a capability of continuously maintaining a vacuum in the deaerating chamber C and the concentration chamber D on the order of 20 to 30 inches of mercury and preferably 28.5 inches of mercury.

In all instances, this vacuum may be considered as a means for causing any air entrapped in the cells or between the cells of the fruit or dissolved in the liquids of the fruit to be evolved therefrom and to migrate to the surface of the fruit. Thus, when the fruit W passes from airlock B into chamber C, the decrease in the surrounding air pressure causes the gases to expand and/or to evolve from a dissolved condition in the liquids. As the gases evolve, they are removed by the suction pump.

In all instances, the worm screw 30 may be considered as a means for advancing fruit through the deaerating chamber C at any desired rate such that the desired degree of deaeration of the fruit may be obtained before it reaches the concentration chamber D. Thus, by varying the speed of the motor 33, the rate of rotation of this screw 30 may be varied and the speed of advancement of the fruit through the deaerating chamber C may be readily controlled. A speed of four to five rpm with the screw having a pitch of six inches has been found satisfactory.

It will be appreciated that other means could be provided for causing the fruit to move longitudinally through the deaerating chamber C, it being important that the fruit is moved slowly and with the least amount of physical contact with mechanical members or the like which could structurally damage the surfaces of the fruit during the deaeration process.

Means are also provided for advancing the fruit longitudinally through the cylinder 45. Such means may take a number of different forms but in the embodiment shown the horizontal axis of the cylinder 45 is sloped downwardly toward the right exit end a desired amount so that as the cylinder 45 rotates, the fruit contained therein will under the force of gravity advance slowly from left to right and ultimately drop off the right end of the cylinder 45 into the hopper 75.

Adjusting screws 90 at the lower end of the legs 91 of the frame F may be used to adjust this angle. Alternatively, the chambers C and D may be adjustably mounted relative to the frame F to provide this downward slope of the axis of the shaft 50.

As the cylinder 45 rotates, it of course tends to carry the fruit W upwardly along its side until the gravitational forces on the fruit W exceed the frictional forces between the fruit and the cylinder walls at which point the cylinder continuously slides under and in contact with the fruit W. The inside of the cylinder 45 is quite smooth so that the friction is held to a minimum.

As the cylinder 45 slides in under the fruit, it gradually moves axially through the cylinder 45 toward the right-hand end.

In preferred operation, the deaerating and concentration chambers C and D are maintained at a vacuum of 28.5 inches of mercury. At this pressure, the boiling temperature of water as determined from conventional engineering handbooks is approximately 93° to 94° F., a temperature substantially below the boiling temperature of water at atmospheric pressures and a temperature substantially below that which breaks down the coloration of the fruit or changes its flavor. In fact, this temperature is below the maximum ambient temperature to which the fruit might be exposed while growing in the fields.

Fruit entering the tube A may be at any temperature ranging from approximately 40° up to 100° F. depending on the ambient temperature at the time of picking. Such fruit is allowed to enter the airlock B by first opening of the valve 15 while maintaining the valve 16 closed and then closing the valve 15 and opening the valve 16. At this point, fruit in the airlock B can fall under the force of gravity into the deaerating chamber C and onto the bottom of cylinder 20. The valve 16 is then closed preparatory to again filling the airlock B with incoming fruit.

Once the fruit enters the deaerating chamber C, the air or other gases dissolved in the juices of the fruit or existing as a gas begin to expand and migrate to the surface of the fruit. In addition because of the decreased pressure outside of the fruit, the liquids and juices of the fruit also commence to migrate to and coat the surface. This results in a very substantial foaming action. As the air migrates to the surface of the fruit, it is immediately sucked off through the riser 84 to the vacuum pump (not shown).

The vacuum also causes some evaporation of the liquids which would normally have a slight cooling effect on the fruit. In order to offset this cooling action and also to increase the rate of evolvement of the air from the fruit juices, the cylinder 25 is heated by hot water or low pressure steam entering through the pipe 26. In the preferred embodiment, this temperature is approximately 215°, which temperature is low enough (considering the limited degree of contact between the surfaces of the cylinder and the fruit W and considering the small amount of air remaining in the deaerating chamber C is a relatively poor conductor of heat) to warm the fruit slightly but in accordance with the invention, the amount of warming is such that the fruit is not heated above the boiling temperature of water at the vacuum pressure maintained. At this temperature and at pressure of 28.5 inches of mercury, the gases do not expand in an amount or at such a rate as to rupture the cell walls.

It will be appreciated that the fruit is made up of large numbers of individual cells, each surrounded by a cell wall through which liquids and/or air or other gases can pass in either direction, either by the forces of osmosis or by the forces of diffusion due to differences in pressure. Such differences in pressure can result in steam or air being evolved within the cells of the fruit at a rate faster than the gases can pass through the walls of the fruit either by osmosis or diffusion. If such happens, the walls of the cells are ruptured and the structural integrity of the fruit will be destroyed. In accordance with the invention, the temperature of the fruit in the deaerating chamber is always maintained below that at which the water in the juices will boil so that excessive differential pressures are not created between the inside of the cells of the fruit and the outside.

Once the fruit W has been deaerated, as can be observed by at least a partial decrease in the rate of foaming, it passes into the cylinder 45. The rate of advancement of the fruit into the cylinder 45 is related to the rate of advancement of the fruit through the cylinder 45 and the speed of rotation thereof such that only a thin layer of the fruit rests on the bottom of the cylinder 45. This is desirable for several reasons, one to prevent excessive compressive forces on the fruit in lower portions of any layer and secondly to provide a maximum exposed area of the fruit to provide for the maximum degree of transfer of juices to the walls of the cylinder.

The cylinder 45 is heated to temperatures substantially higher than that in the deaerating chamber C, it having been found that once the air has been evolved, it is then possible to increase the evolvement of the liquids through the cell walls but it should be emphasized that it is necessary that the liquids within the cells never reach the boiling temperature of water at the vacuum being maintained.

Thus, at the vacuum being maintained, liquids within the cells of the fruit will either pass through the cell walls by diffusion or osmosis, it being appreciated that as the water on the surface of the fruit evaporates, the concentration or amount of sugar in the water on the surface of the fruit is in excess of that within the cells of the fruit and osmotic action can result in addition to diffusion.

As the cylinder 45 rotates with the fruit slipping and sliding thereon, the liquids which migrate to the surface of the fruit adhere to and coat the inner surface of the cylinder 45 with a coating indicated generally by the number 100. This is a thin layer of a continuously thickening liquid which is continuously heated by the conductance of heat from the walls of the cylinder 45. As the walls of the cylinder 45 are heated to a temperature in excess of the boiling temperature of water at the vacuum pressure being maintained, there is a boiling and rapid evaporation of water from the surface of the cylinder and as this water evaporates, the water vapor (now a gas) is constantly evacuated by means of the vacuum pump. A rotational speed of 15 to 20 rpm has been found satisfactory.

Importantly, at no time should there be a bare surface of the cylinder 45 exposed. Thus, the rate of rotation of the cylinder 45 and the temperature of the steam being admitted to the cylinder 45 are so controlled that all portions of the interior surface of the cylinder 45 are at all times coated with a liquid. Thus, by the time any point on the cylinder 45 has left behind the fruit and has completed its arc of rotation and again commences to slide under the fruit, it is still wetted with fruit juices. In this way it will be appreciated that no matter how hot the cylinder 45 is heated, the temperature of the juices in contact with the fruit W can never exceed the boiling temperature of water at the vacuum pressure being maintained. At all times the juices are maintained at a temperature of approximately 93° F. Obviously this temperature may vary up and down within limits as the vacuum within the concentration chamber D varies. The fruit is gradually heated by radiation and/or convection and/or conduction up to but never in excess of the boiling temperature.

By the time the fruit has reached the right-hand end of the cylinder 45, depending upon the rate of advancement, the amount of concentration will normally be between 40 and 60% of the original weight of the fruit. By varying the slope of the axis 50, the rate of movement of the fruit through the chamber D can be controlled and greater degrees of concentration can be obtained if desired.

Once the fruit falls from the right-hand end of the cylinder 45, it drops into the hopper 75 and then passes through the airlock 80 for ultimate disposition which may be freezing for shipment or immediate processing into an ultimate end product. Thus, if immediately processing is desired, the fruit can be heated to a suitable canning temperature, e.g., 180° to 190° F. and the necessary citric acid added to activate the pectin.

The fruit, as it leaves the airlock 80, is covered with a generally sticky syrup but the pieces of fruit are in essentially the same form, configuration, shape, color and flavor as when it entered the deaerating chamber C, the only difference being a slight decrease in physical size due to the removal of large amounts of water. If washed off, the fruit does not have the wrinkled appearance of prunes or raisins but is firm and smooth textured.

It will thus be seen that a process for the concentration of fruit has been provided wherein the fruit is first subjected to a degassing or deaerating step while holding its temperature at a level such that pressures within the cells of the fruit relative to pressures external of the fruit do not create forces sufficient to rupture the cell walls so that the air within the fruit can be removed and thereafter the juices of the fruit are caused to migrate to the surface where the juices only are exposed to temperatures above the boiling temperature of water but in such a way that the fruit itself can never be heated to a temperature above the boiling temperature of water at the vacuum being maintained, which temperature is below that at which the discoloration, degradation of fruit flavor or other undesirable chemical reactions begin to set in.

Specific examples of the operation are as follows.

EXAMPLE I

In a unit, such as shown in the drawing, within the heating surface of the revolving cylinder a total of 1,200 pounds of strawberries was concentrated. These whole strawberries were sound, firm, suitable, washed berries which were fed to the unit through airlock B, into the deaerater C, and then into the evaporator D. Because berries only were used, very low steam pressure (2 psig) (218° F.) were used. One thousand pounds of strawberries were fed into the unit per hour. Five hundred pounds of berries were discharged per hour into the airlock E. Each piece of fruit was almost entirely whole, and showed a soluble solids content twice that of the ingoing fruit.

EXAMPLE II

Whole, sound strawberries were fed into the airlock B along with a 70% solids sugar syrup in the proportions of five parts by weight volume of fruit to one part of the sugar syrup. A steam pressure of eight psig was used on the drum 40. A vacuum was maintained at 28.5 inches of mercury (719 mm Hz or 40.375 mm of pressure), resulting in an evaporation temperature of just under 100° F. Twelve hundred pounds of the mixture of fruit and syrup was fed to the evaporator per hour. Six hundred pounds per hour of the fruit and sugar was discharged from the unit. The fruit remained whole and displayed an excellent bright color.

EXAMPLE III

Elberta free-stone peaches were skinned, sliced and fed to the unit without the addition of anything else. A steam pressure of 40 psig (270° F.) was maintaned in the cylinder 40, and vacuum was maintained at 28.5 inches. Sixteen hundred pounds of peaches were fed to the unit per hour, and seven hundred pounds of sliced peaches concentrated two-fold were discharged from the unit per hour.

EXAMPLE IV

A mixture of strawberries, corn syrup, and pectin solution was blended so that the proportion of fruit to sweetener solids was 47-55. This satisfies the U.S. requirements for a fruit preserve. The brix of this mixture at this point was 46 as measured by a refractometer. The mixture was fed to the evaporator, using the same procedures as in the other examples, at the rate of 18,000 pounds per hour. By suitable adjustment of the steam pressure in the revolving cylinder, the discharged product measured 65.5 brix by refractometer. A vacuum of 28.5 inches was maintained. The discharge rate was 12,064 pounds per hour. This product was then raised to a suitable canning temperature (180°-190° F.) and the necessary citric acid added to activate the pectin. The product was filled into glass jars. This produced a superior strawberry preserve with almost all of the fruit intact and with bright color and fresh flavor.

In operation, it will be appreciated that there will be a temperature gradient in the inner wall of cylinder 45 from the surface facing space 67 to the inner surface due to the continuous cooling effect of the water in the coating on the inner surface as it evaporates. It being impossible to accurately measure this temperature of the surface at the exact point of contact with the liquid coating, "temperature of the cylinder wall" as used in the claims will be that of the heating medium or the temperature to which the inner surface would reach if there was no liquid coating.

Thus, it will be seen that an apparatus for the concentration of fruit has been described in sufficient detail to enable anyone skilled in the art to which this invention pertains to make and use the invention. Obviously modifications and alterations in the apparatus described herein will occur to others upon a reading and understanding of this specification. It is my intention to include all such modifications and alterations insofar as they come within the scope of the appended claims.

Having thus described my inventon, I claim:

1. Apparatus for the concentration of fruits comprising in combination: a deaerating chamber and a concentrating chamber, each of said chambers having an entrance end and an exit end, said exit end of said deaerating chamber being in continuous communication with said entrance end of said concentrating chamber; means for maintaining both of said chambers at a vacuum in excess of 20 inches of mercury; an air lock at the entrance to said deaerating chamber for communicating pieces of fruit to said chamber; means for moving said fruit through said deaerating chamber and into said concentrating chamber, said concentrating chamber comprising a hollow heated cylinder having a smooth inner surface; means for rotating said cylinder about a longitudinal axis; an air lock at the exit end of said cylinder remote from said deaerating chamber for receiving concentrated fruit; means for heating said deaerating chamber and independent means for heating said concentrating chamber; said cylinder having a longitudinal axis sloping downwardly from said exit end of said deaerating chamber to said exit end of said concentrating chamber.

2. The apparatus of claim 1 wherein means for moving said fruit through said deaerating chamber is a worm screw and means for rotating said screw at a controlled rate.

* * * * *